(12) United States Patent
Joffe et al.

(10) Patent No.: US 7,701,689 B1
(45) Date of Patent: Apr. 20, 2010

(54) PROTECTOR BLOCK ASSEMBLY FOR PROVIDING SURGE PROTECTION IN TELECOMMUNICATION SYSTEMS

(75) Inventors: Daniel M. Joffe, Owens Crossroads, AL (US); Grant J. Kruse, Owens Crossroads, AL (US); Jeremy L. Harris, Eva, AL (US)

(73) Assignee: Adtran, Inc., Huntsville, AL (US)

( * ) Notice: Subject to any disclaimer, the term of this patent is extended or adjusted under 35 U.S.C. 154(b) by 231 days.

(21) Appl. No.: 12/023,818

(22) Filed: Jan. 31, 2008

(51) Int. Cl.
*H02H 1/04* (2006.01)
(52) U.S. Cl. .................................. 361/119
(58) Field of Classification Search ............. 361/119
See application file for complete search history.

(56) References Cited

U.S. PATENT DOCUMENTS

| | | | |
|---|---|---|---|
| 5,189,588 A | 2/1993 | Yano et al. | |
| 5,457,593 A | 10/1995 | Glaser et al. | |
| 5,563,761 A | 10/1996 | Apa et al. | |
| 6,008,976 A | 12/1999 | Pisterzi | |
| 6,071,126 A | 6/2000 | Daoud | |
| 6,072,683 A | 6/2000 | Masghati | |
| 6,146,149 A | 11/2000 | Daoud | |
| 6,151,392 A * | 11/2000 | Castonguay et al. | 379/437 |
| 6,671,174 B1 | 12/2003 | Heidorn | |
| 6,731,489 B2 | 5/2004 | Heidorn et al. | |
| 7,294,024 B2 * | 11/2007 | Hammond et al. | 439/676 |
| 7,311,550 B2 * | 12/2007 | Hammond et al. | 439/540.1 |
| 2009/0225523 A1* | 9/2009 | Onishi et al. | 361/752 |

\* cited by examiner

*Primary Examiner*—Stephen W Jackson
*Assistant Examiner*—Ann T Hoang
(74) *Attorney, Agent, or Firm*—Lanier Ford Shaver & Payne, P.C.; Jon E. Holland

(57) ABSTRACT

A protector block assembly interfaces a plurality of subscriber lines to communication equipment, such as digital subscriber line (DSL) modems. The assembly has a protector block into which surge protection modules are plugged. Each surge protection module limits the current that may pass from a respective subscriber line to communication equipment protected by the assembly. When plugged into the protector block, the surge protection modules are oriented such that crosstalk interference from the protector block is canceled thereby reducing the amount of crosstalk introduced by the protector block.

14 Claims, 20 Drawing Sheets

(Bottom View)

(Top View)

(Side View)

(Top View)

(Top View)

(Side View)

(Top View)

(Bottom View)

PROTECTOR BLOCK ASSEMBLY FOR PROVIDING SURGE PROTECTION IN TELECOMMUNICATION SYSTEMS

RELATED ART

Protector block assemblies are often installed near telecommunications equipment to provide a means for installing connectorized surge protection for communication equipment communicating across one or more subscriber lines. In this regard, a protector block assembly usually comprises a plurality of surge protection modules connected to a protector block. Each surge protection module couples a respective subscriber line to communication equipment, such as a digital subscriber line (DSL) modem, for communicating across the subscriber line. The surge protection module limits the voltage and/or current that is allowed to pass thereby protecting the communication equipment from electrical surges resulting from abnormal operating conditions or phenomena, such as lightning.

In an effort to reduce the overall size of the protector block assembly, the surge protection modules are often positioned close to one another on a surface of the protector block. While such close positioning of the modules helps to conserve space, it also increases crosstalk and, therefore, decreases the overall performance of the communication system. In this regard, energy from an electrical signal being communicated across one subscriber line may couple from one surge protection module and the associated connectors in the protector block to another subscriber line thereby interfering with the signal being communicated through the other subscriber line. Generally, the closer that the surge protection modules are located to one another, the more crosstalk interference that is introduced by the protector block assembly.

Crosstalk interference could be reduced by spreading the surge protection modules, but significant spreading of the surge protection modules is generally viewed as undesirable since it would increase the size of the protector block assembly. Indeed, a relatively large number (e.g., 50 to 100 or more) of surge protection modules may be connected to a single protector block, and increasing the distance between each surge protection module by even a small amount can have a relatively profound effect on the overall footprint of the protector block assembly.

Moreover, techniques for reducing the amount of crosstalk interference introduced by a protector block assembly without drastically increasing the size of the assembly are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to protector block assemblies that introduce relatively low crosstalk interference. A protector block assembly in accordance with one exemplary embodiment of the present disclosure, has a plurality of surge protection modules connected to a protector block. Each surge protection module has at least two pair of pins, one pair referred to herein as the "tip pair" and the other pair referred to herein as the "ring pair." The tip pair is coupled to one connection, referred to as "tip," of a subscriber line, and the ring pair is coupled to another connection, referred to as "ring," of the same subscriber line.

The protector block is arranged such that a surge protection module is rotated relative to at least one adjacent surge protection module such that the tip and ring pairs of one module are symmetric about the tip and/or ring pair of the other module. Thus, crosstalk energy that couples from one module to the other is effectively canceled thereby reducing crosstalk interference introduced by the protector block assembly.

Figure 1:
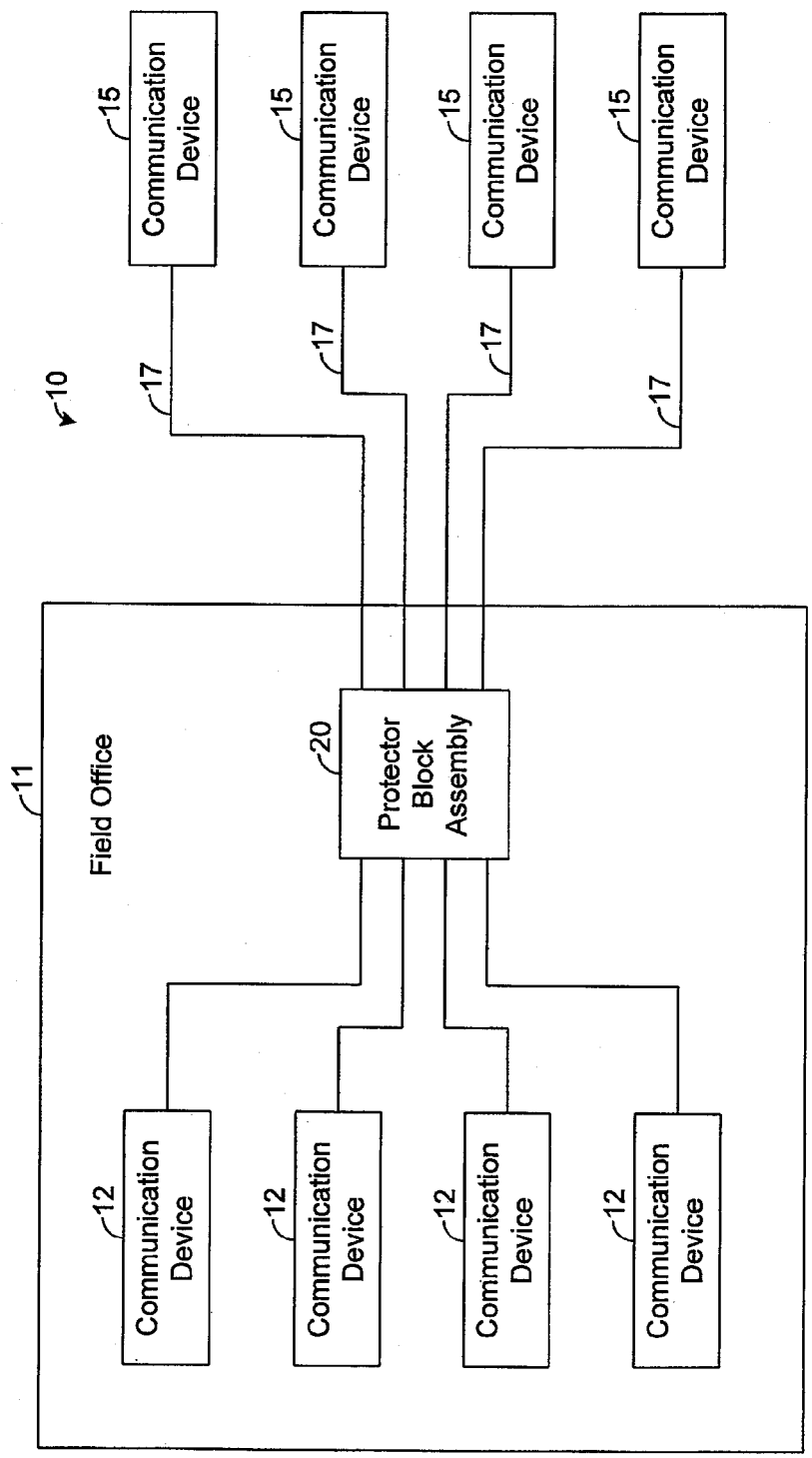
FIG. 1 is a block diagram illustrating a conventional telecommunication system.

FIG. 1 depicts a conventional telecommunication system 10. In this regard, the system 10 comprises a field office 11, such as a central office, of a communication network, such as the Public Switched Telephone Network (PSTN). Communication devices 12, such as x-DSL modems, at the field office 11 communicate with communication devices 15, such as x-DSL modems, at one or more customer premises via a plurality of subscriber lines 17. Each subscriber line 17 comprises a pair of conductive wires, one of which is referred to as "tip" and the other is referred to as "ring." Tip and ring are often twisted together and collectively referred to as a "twisted pair."

In the embodiment shown by FIG. 1, the subscriber lines 17 are coupled to the communication devices 12 at the field office 11 via a protector block assembly 20. In this regard, the protector block assembly 20 couples each subscriber line 17 to a respective one of the communication devices 12. Further, the protector block assembly 20 limits the current that may pass and protects the communication devices 12 from electrical surges resulting from abnormal operating conditions or phenomena, such as lightning. Although not explicitly shown in FIG. 1, a similar protector block assembly 20 may be used at any customer premises to protect any of the communication devices 15. In one exemplary embodiment, the protector block assembly 20 is implemented at a remote terminal in order to protect communication equipment in a cabinet at the remote terminal. In another exemplary embodiment, the protector block assembly 20 is implemented within a casing of an outside plant (OSP) digital subscriber line access multiplexer (DSLAM) in order to protect components of the DSLAM. Various other locations of the protector block assembly 20 are possible, and the assembly 20 can be used to protect various types of communication equipment.

Figure 2:
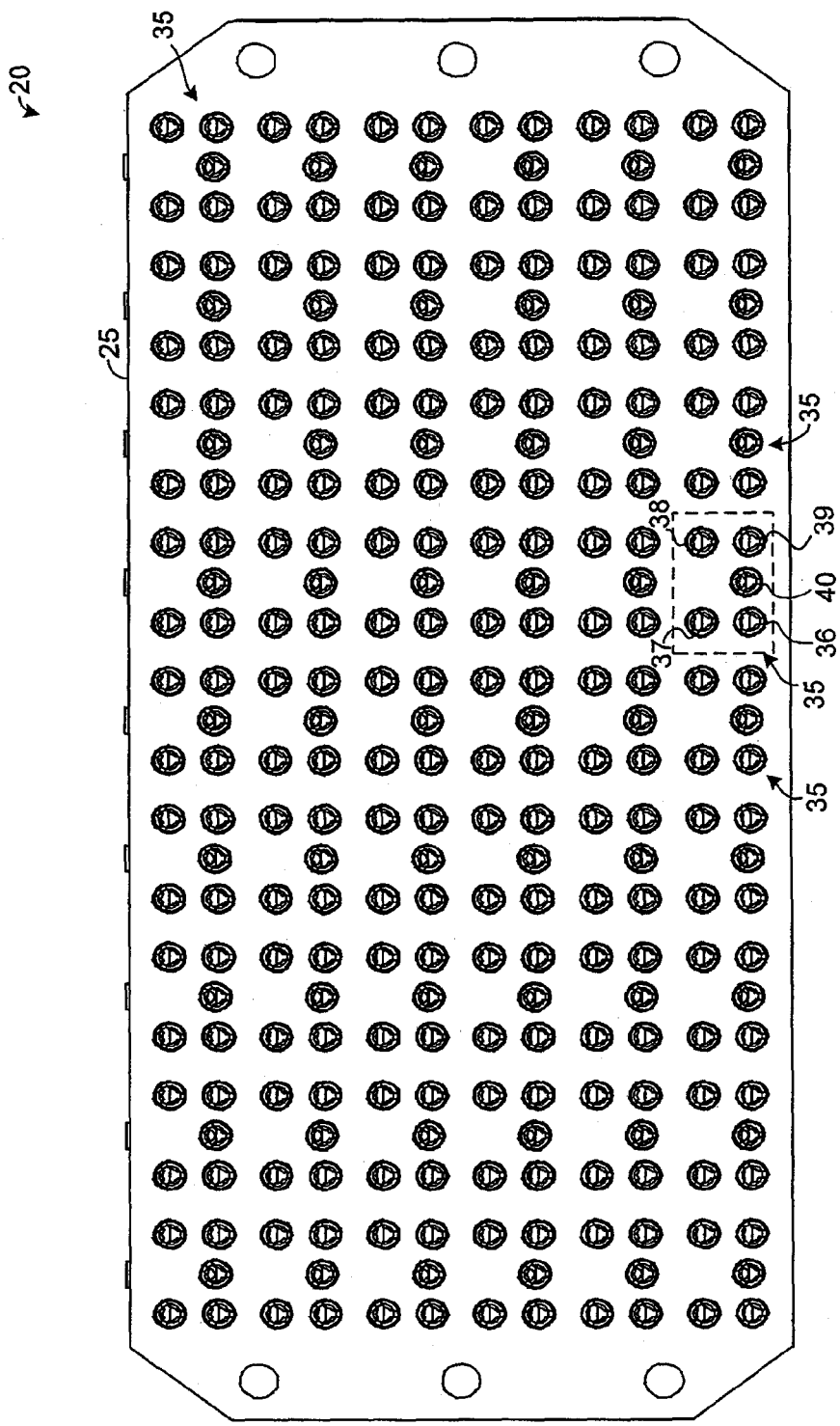
FIG. 2 illustrates a top view of a conventional protector block assembly depicted in FIG. 1.
Figure 4:
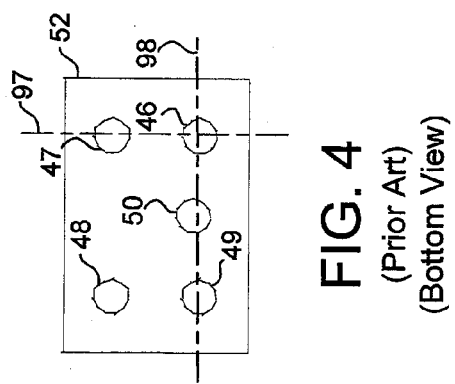
FIG. 4 illustrates a bottom view of the surge protection module depicted in FIG. 3.
Figure 3:
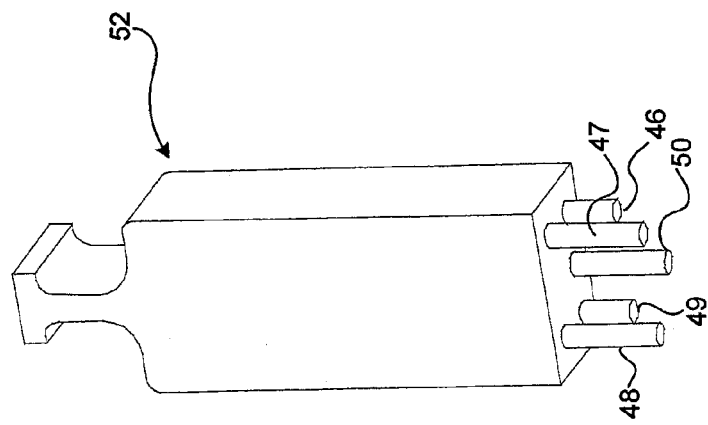
FIG. 3 illustrates a perspective view of a conventional surge protection module that may be connected to a protector block depicted in FIG. 2.

FIG. 2 depicts a top view of a protector block 25 for the conventional protector block assembly 20. The protector block 25 has sets 35 of receptacles 36-40 for receiving conductive pins 46-50 of surge protection modules 52, such as is depicted by FIGS. 3 and 4. In this regard, each set 35 is arranged to receive the pins 46-50 of a single surge protection module 52. As will be described in more detail hereafter, pins 47, 48, which pass through receptacles 37, 38, respectively, are connected to a subscriber line 17, and pins 46, 49, which pass through receptacles 36, 39, respectively, are connected to one of the communication devices 12. Further, the pin 50 is coupled to a ground strap.

Figure 5:
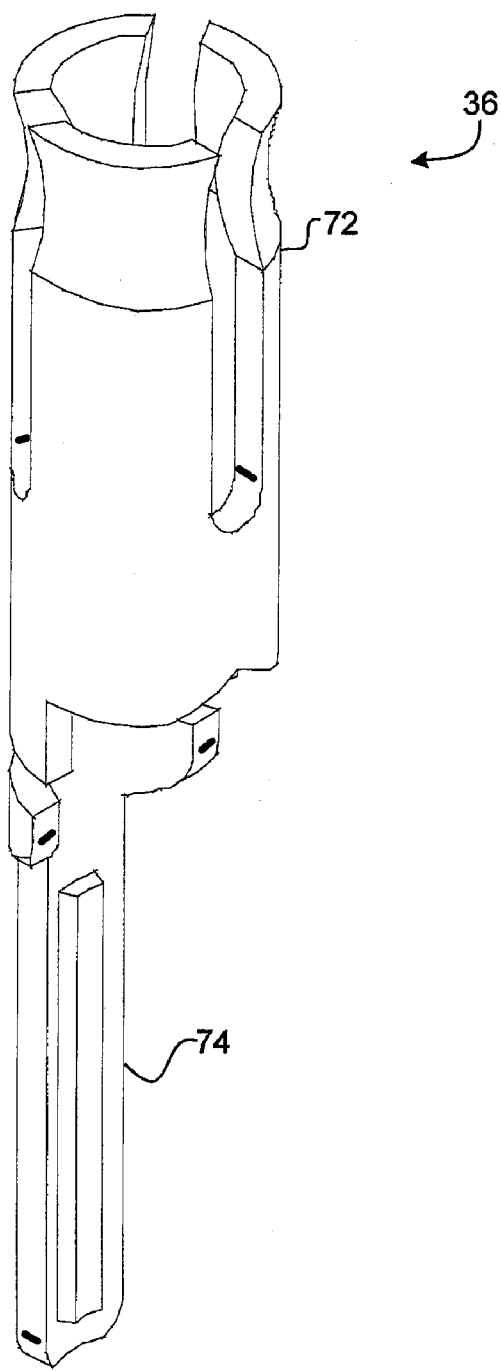
FIG. 5 illustrates a perspective view of a protector block receptacle.
Figure 6:
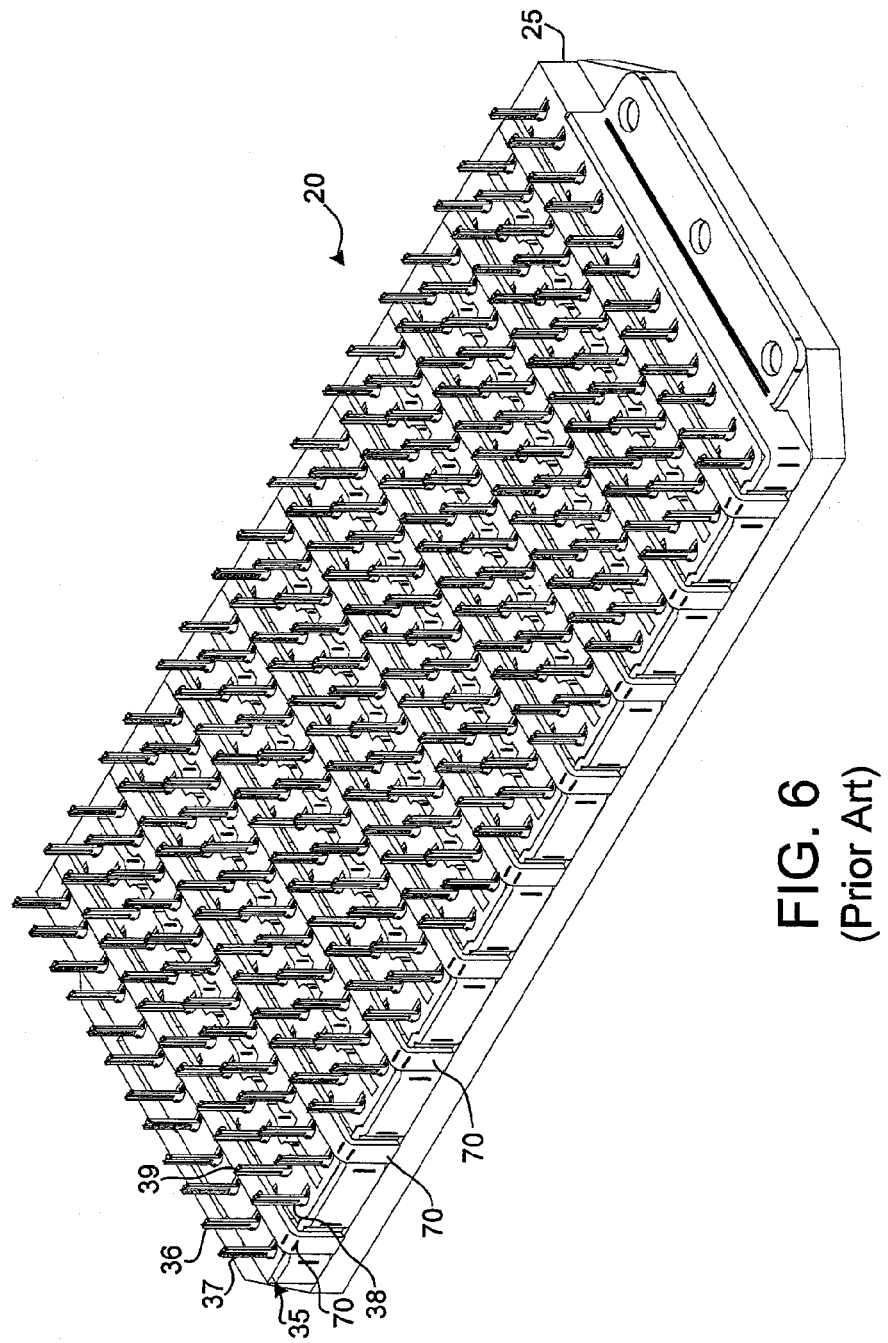
FIG. 6 illustrates a bottom perspective view of the protector block assembly depicted in FIG. 2.

Each receptacle 36-40 is mounted within a respective hole of the protector block 25 and is composed of conductive material. FIG. 5 depicts one the receptacles 36. The receptacle 36 has a head 72 and a leg 74. The head 72 is positioned within a hole of the protector block 25, and the leg 74 is external to and extends from the protector block 25, as shown by FIG. 6. The head 72 is hollow and dimensioned such that, when a pin of a surge protection module 52 is inserted into the head 72, the pin passes through and makes electrical contact with the head 72. Electrical contact with another device, such as a subscriber line or communication equipment, is also achieved by wrapping a wire around the leg 74 using conventional wire-wrapping techniques. The other receptacles 37-39 are configured identical to the receptacle 36 shown by FIG. 5.

Referring to FIG. 6, a plurality of conductive ground straps 70 extend across the back surface of the protector block 25. Further, the receptacle 40 is configured similar to the receptacle 36 shown by FIG. 5 except that the leg (not shown in FIG. 6) of the receptacle 40 is shorter. In this regard, the leg of the receptacle 40 is of a length such that the end of its leg contacts a ground strap 70. The leg of the receptacle 40 may be soldered to its respective ground strap 70.

Figure 7:
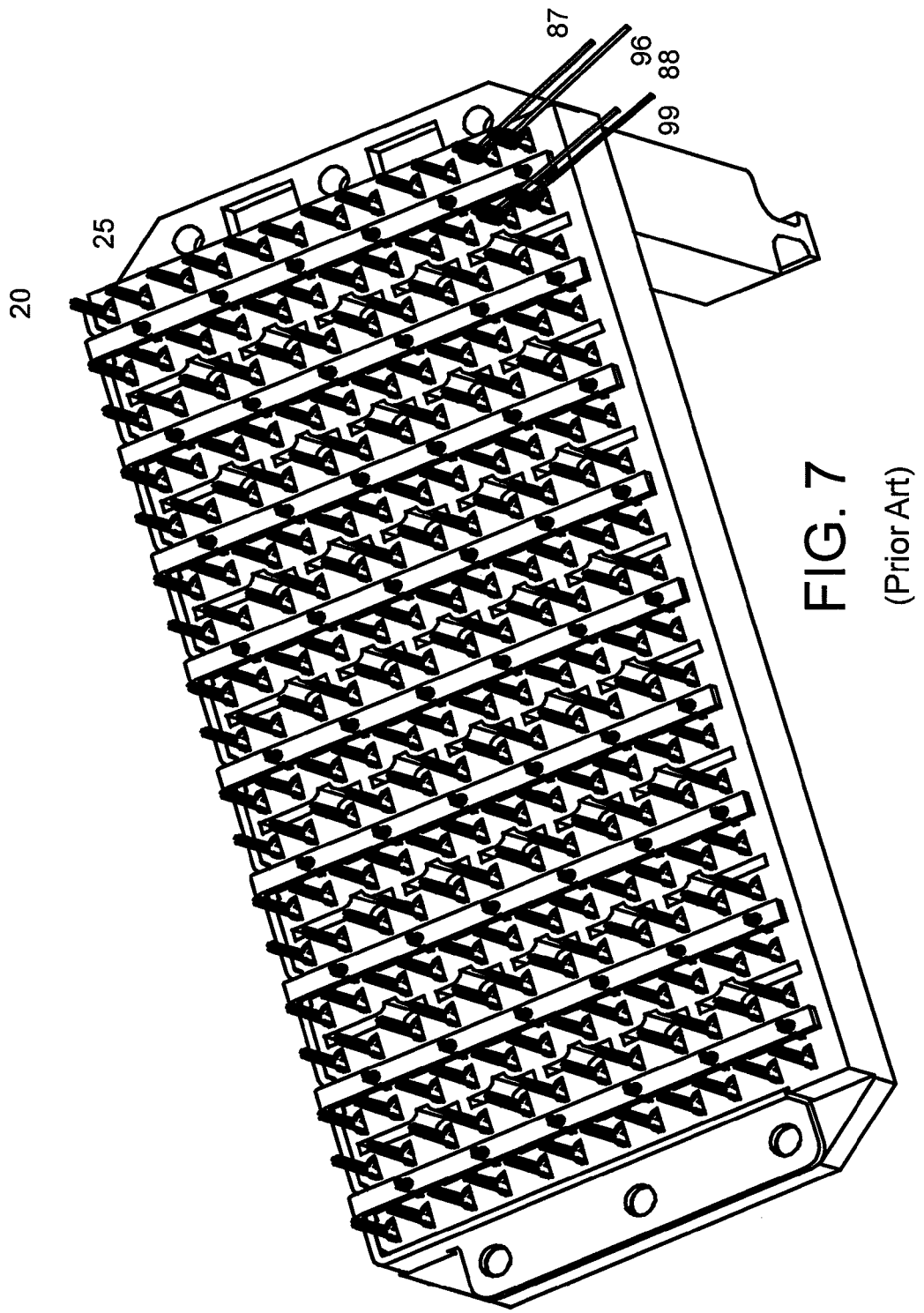
FIG. 7 illustrates a bottom view of the protector block assembly depicted in FIG. 2.

FIG. 7 depicts a bottom view of the protector block 25 for one of the receptacle sets 35. As shown by FIG. 7, the end of the tip connection 87 of a subscriber line 17 is wrapped around the leg of the receptacle 37, and the end of the ring connection 88 of the subscriber line 17 is wrapped around the leg of the receptacle 38. Further, receptacle 37 is electrically coupled to the receptacle 36 by the surge protection module 52, and the receptacle 39 is electrically coupled to the receptacle 38 by the surge protection module 52. Thus, receptacles 36, 37 and, therefore, the pins 46, 47 (FIG. 4) respectively inserted into the receptacles 36, 37 are coupled to the tip connection 87, and the pins 46, 47 shall be collectively referred to herein as the "tip pair." Further, the receptacles 38, 39 and, therefore, the pins 48, 49 (FIG. 4) respectively inserted into the receptacles 38, 39 are coupled to the ring connection 88, and the pins 48, 49 shall be collectively referred to herein as the "ring pair."

As shown by FIG. 7, a conductive connection 96 is wrapped around the receptacle 36 and couples the receptacle 36 and, therefore, the pin 46 (FIG. 4) inserted into the receptacle 36 to a communication device 12. Further, a conductive connection 99 is wrapped around the receptacle 39 and couples the receptacle 39 and, therefore, the pin 49 (FIG. 4) inserted into the receptacle 39 to the communication device 12. Thus, the communication device 12 can transmit electrical signals through the surge protection module 52 and the subscriber line 17 to a remote communication device 15, and/or the remote communication device 15 can transmit electrical signals through the subscriber line 17 and the surge protection module 52 to the communication device 12.

For purposes of illustration, assume that each surge protection module 52 has a vertical axis 97 (FIG. 4) that passes through the centers of pins 46, 47, which are the tip pair in FIG. 4. Also assume that a horizontal axis 98 passes through the centers of pins 46, 49. In the embodiment shown by FIG. 4, the vertical and horizontal axes are perpendicular. Note that the horizontal axis 98 passes through the pin 50 but is not aligned with the center of this pin 50. Further, a line passing through the centers of pins 48, 49 is parallel to the vertical axis 97, and a line passing through the centers of pins 47, 48 is parallel to the horizontal axis 98.

Within the surge protection module 52 are components (not shown), such as gas tubes and/or solid-state circuitry, that limit the current that may pass between pins 46, 47 and that may pass between pins 48, 49. Moreover, such components protect the communication device 12 from high voltages and/or currents that may be present on the subscriber line 17 due to various abnormal conditions or phenomena, such as lightning.

Figure 8:
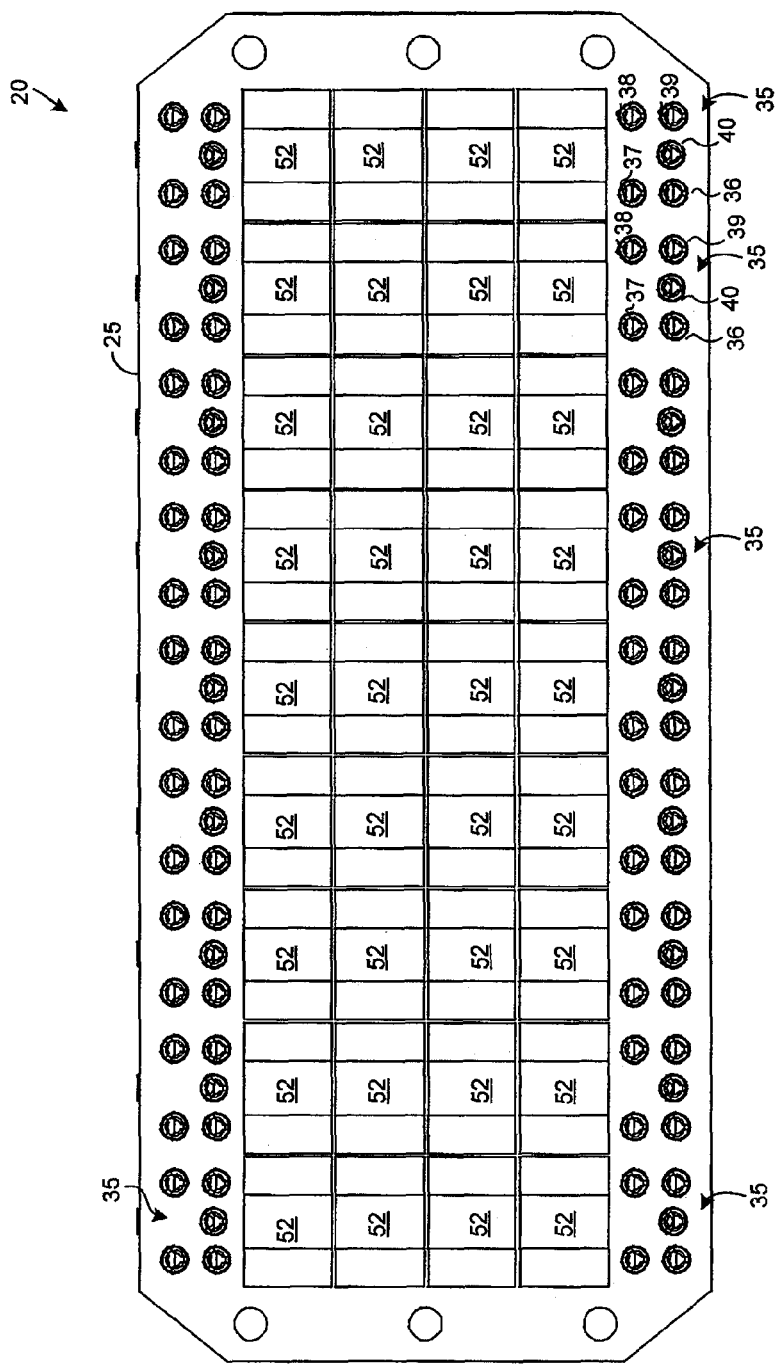
FIG. 8 illustrates a top view of surge protection modules mounted on the protector block depicted in FIG. 2.

Referring to FIG. 2, each set 35 of receptacles 36-40 is arranged in the same pattern such that each module 52, when plugged into a respective set 35 of receptacles 36-40, is oriented in the same direction, as shown by FIG. 8. In this regard, FIG. 8 depicts four rows of modules 52 plugged into the inner four rows of receptacle sets 35 of the protector block 25. Note that surge protection modules 52 may also be plugged into the outer two rows of receptacle sets 35, but these outer two rows of receptacle sets 35 are exposed in FIG. 8 for illustrative purposes.

Figure 9:
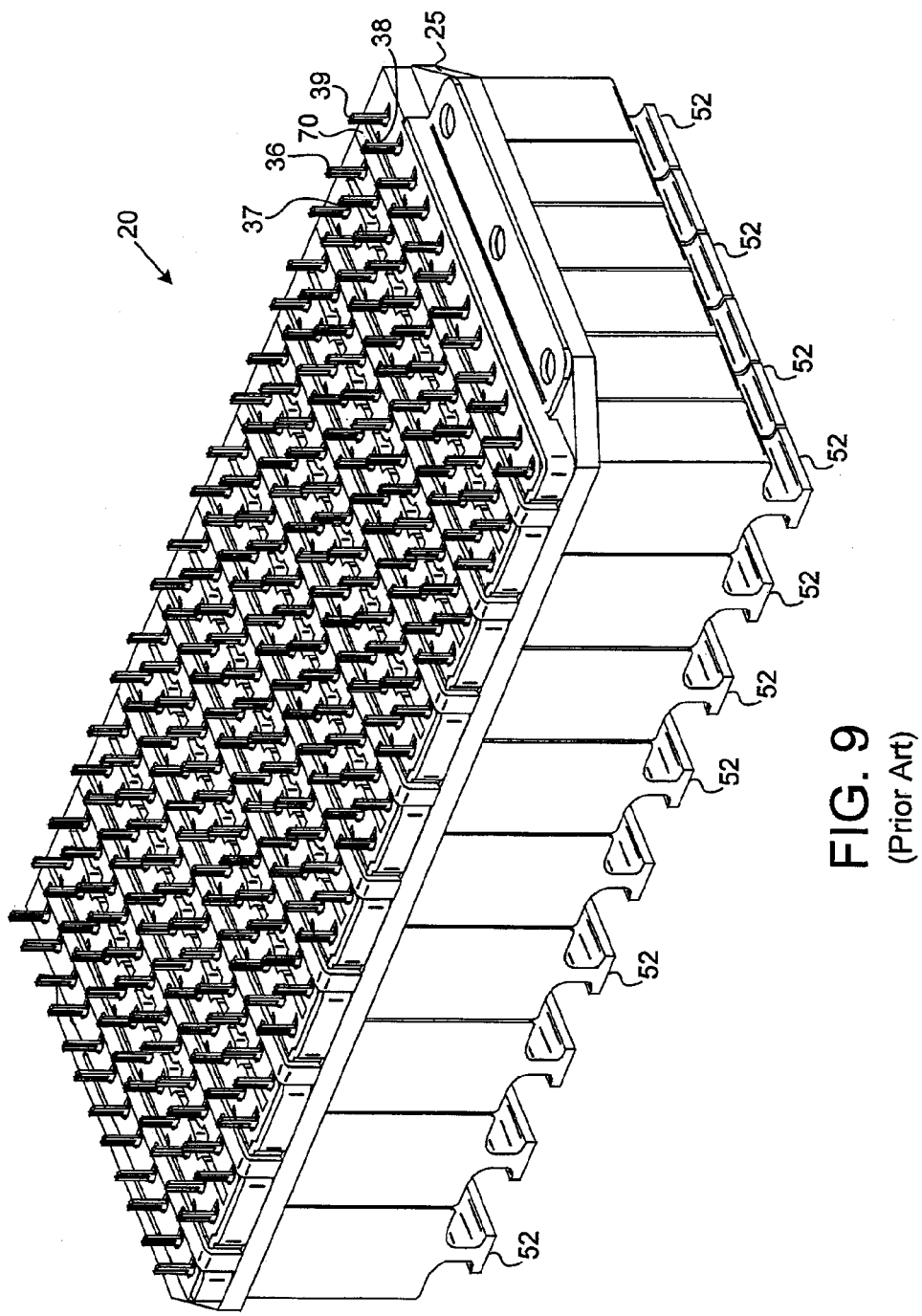
FIG. 9 illustrates a bottom perspective view of surge protection modules mounted on the protector block depicted in FIG. 2.

As can be seen by viewing FIG. 8, the sets 35 of receptacles 36-40 are arranged such that each module 52 barely fits between its adjacent modules 52. The symmetrical orientation of each surge protection module 52 generally helps to reduce the overall size of the block 25 by helping to reduce the amount of space between adjacent modules 52. FIG. 9 depicts a bottom perspective view of the protector block assembly 20 having a respective surge protection module 52 connected to each set 35 of receptacles 36-40.

Although the tight spacing between modules 52 helps to reduce the overall size of the assembly 30, the tight spacing also increases crosstalk interference. In this regard, the closer that any two modules 52 are located to one another, the greater is the amount of energy that couples from the pins 46-50 or receptacle 36-40 for one module to the pins 46-50 or receptacles 36-40 for another module 52. In the past, increased levels of crosstalk have been generally viewed as an acceptable cost relative to the benefit of closely spacing the modules in order to reduce the footprint of the assembly 20. However, it is generally desirable to reduce the level of crosstalk in any communication system, if practicable, so that signal-to-noise ratios can be improved thereby enabling higher data rates. This is particularly true where data rate and bandwidth are higher as crosstalk generally rises with increasing frequency.

In accordance with one exemplary embodiment of the present disclosure the layout of a protector block is arranged such that an electrically interconnected pair of pins of a surge protection module 52 are located about the same distance from both the tip pair and the ring pair of an adjacent surge protection module. As used herein, an "electrically interconnected pair" of a surge protection module 52 refers to a pair of pins that are electrically coupled to one another by the surge protection module. Thus, the term "electrically interconnected pair" may refer to either the tip pair or ring pair of a surge protection module. Since an electrically connected pair of one module 52 is about the same distance from both the tip pair and ring pair of an adjacent surge protection module, crosstalk energy coupling from one module to the other is canceled thereby improving the signal-to-noise ratios of the signals communicated through the modules 52.

Figure 10:
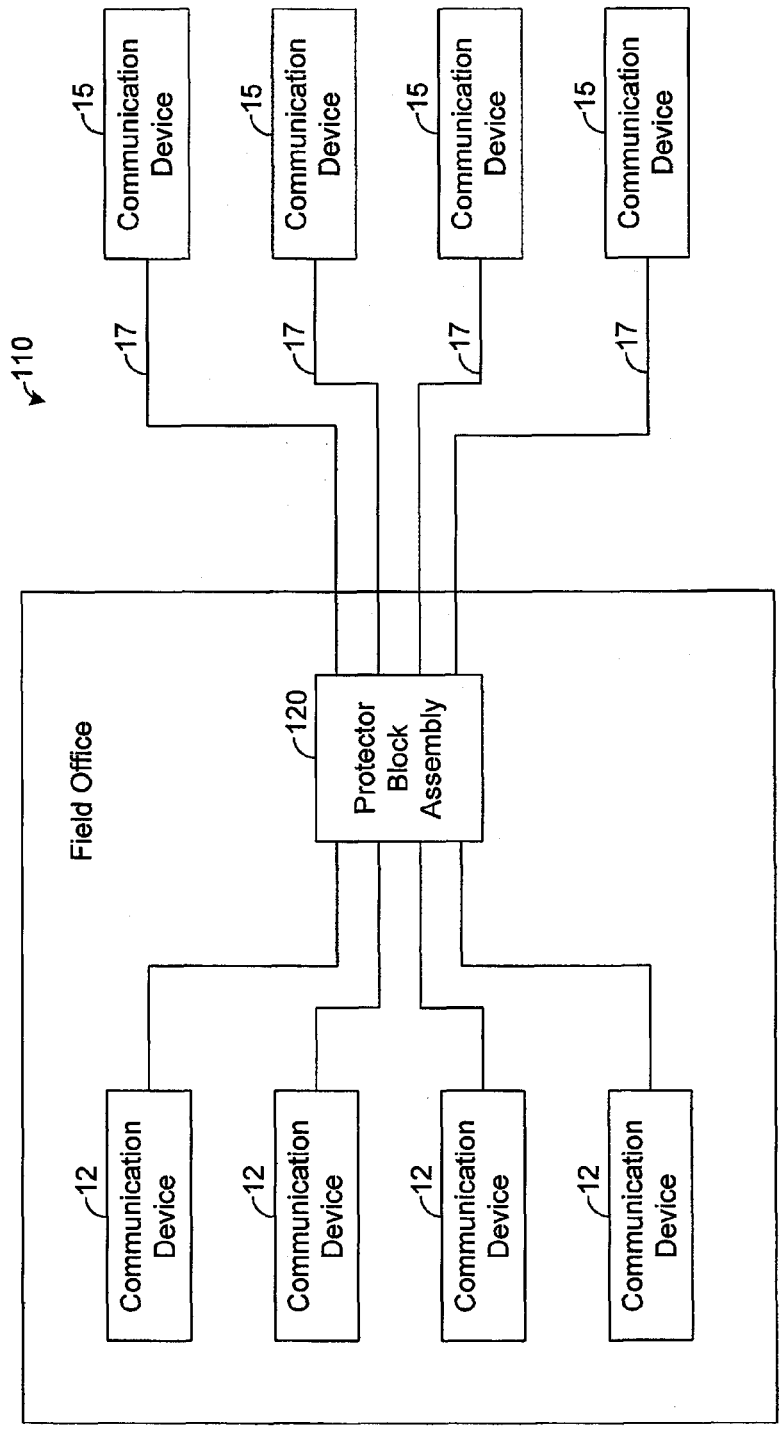
FIG. 10 is a block diagram illustrating an exemplary embodiment of a telecommunication system in accordance with the present disclosure.

FIG. 10 depicts an exemplary embodiment of a communication system 100 in accordance with the present disclosure. As can be seen by comparing FIG. 10 to FIG. 1, the system 100 of FIG. 10 is similar to the conventional system 10 shown by FIG. 1 except that a protector block assembly 120 in accordance with the present disclosure is used in lieu of conventional assembly 20.

Figure 11:
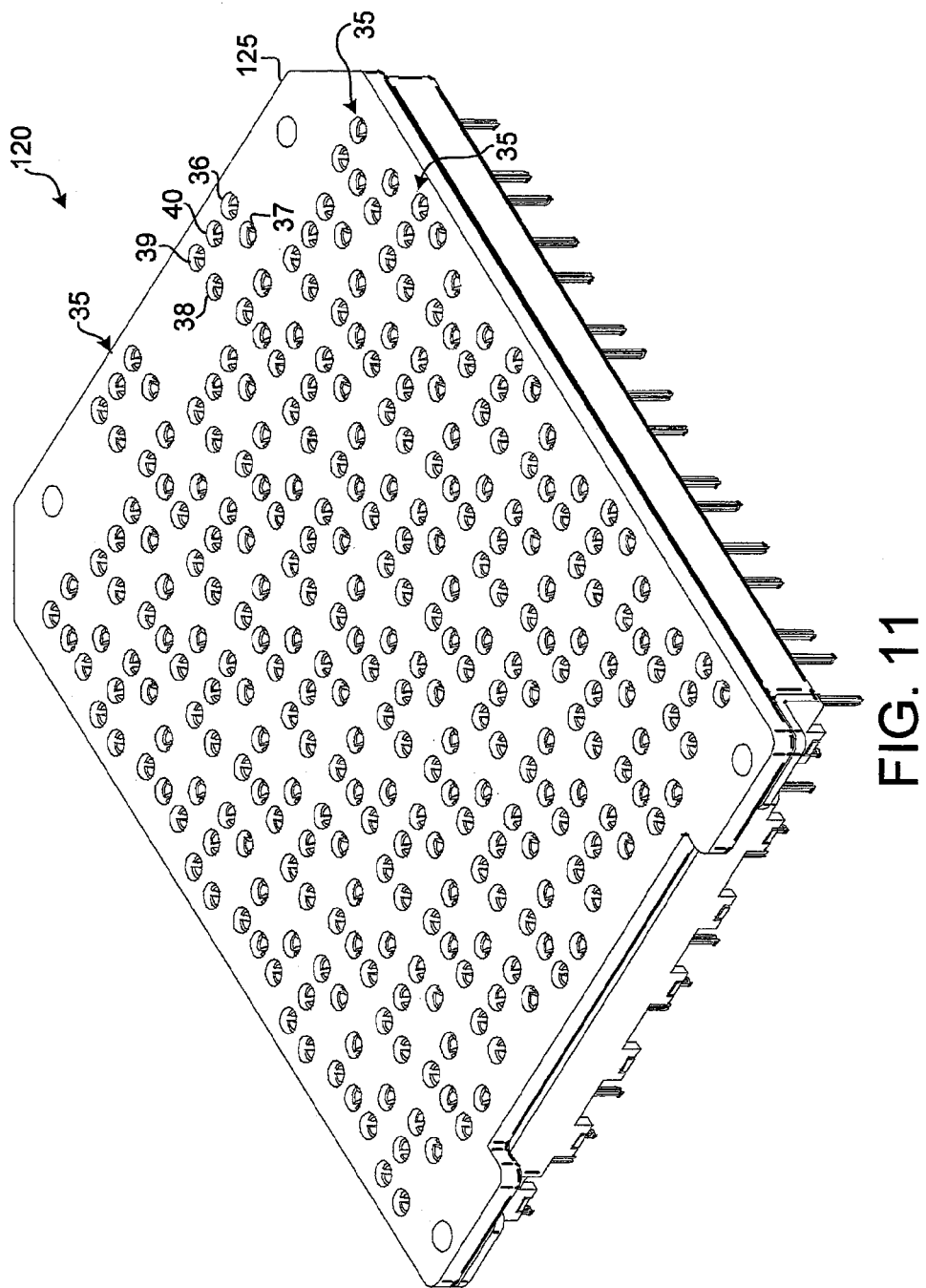
FIG. 11 illustrates a top perspective view of an exemplary embodiment of a protector block assembly, such as is depicted in FIG. 10.
Figure 12:
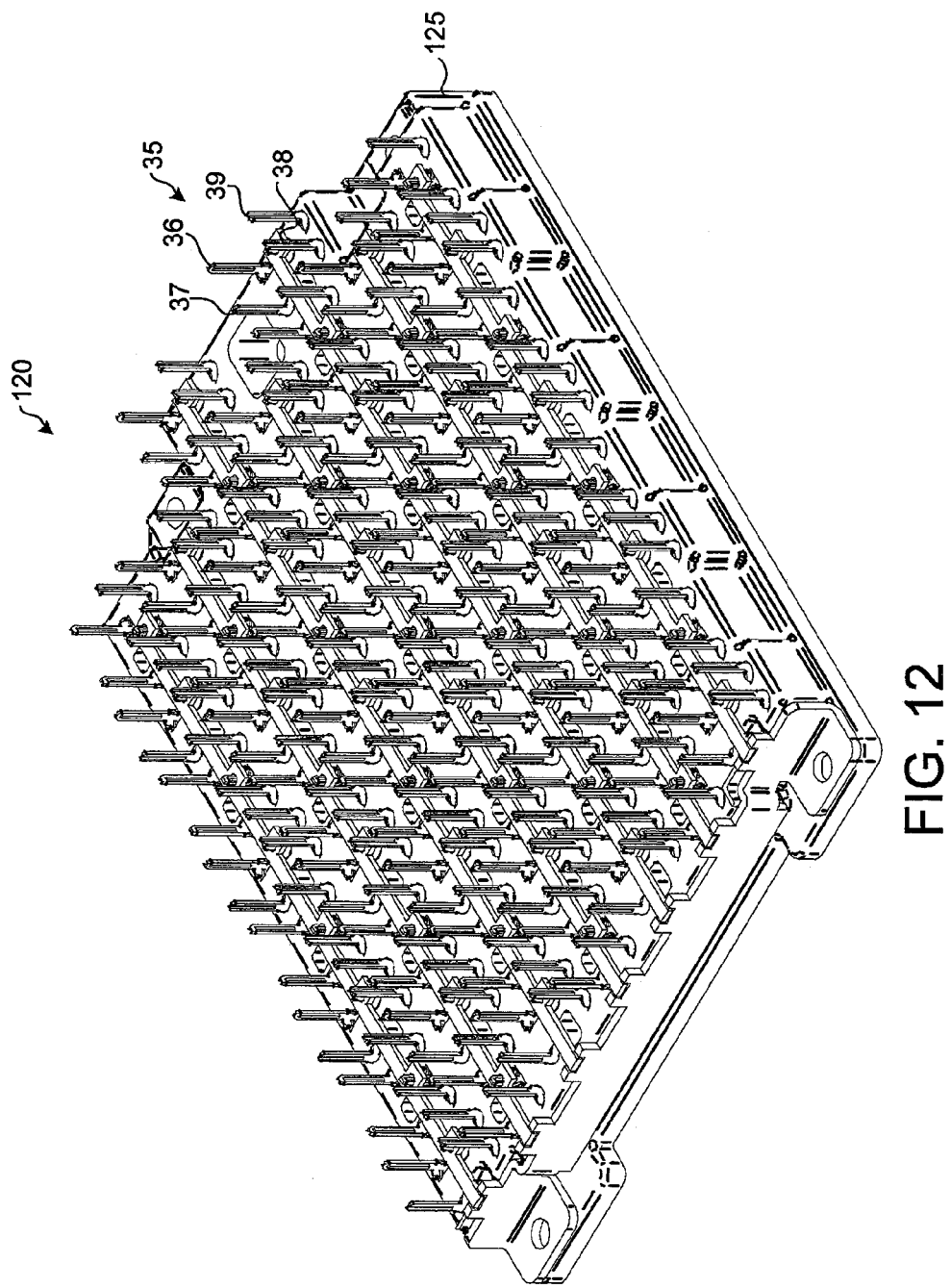
FIG. 12 illustrates a bottom perspective view of a protector block assembly, such as is depicted in FIG. 11.
Figure 13:
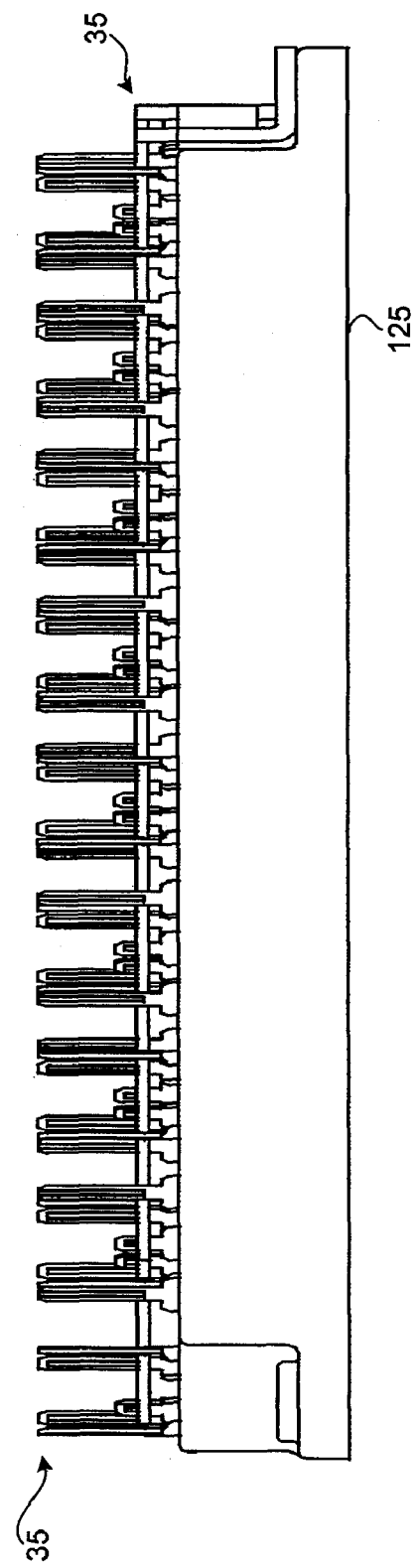
FIG. 13 illustrates a side view of a protector block assembly, such as is depicted in FIG. 11.

FIGS. 11-13 depict an exemplary embodiment of a protector block assembly 120 in accordance with the present disclosure. Except for the orientation of the receptacles 36-39, as will be described in more detail hereafter, the protector block assembly 120 is similar to the conventional protector block assembly 20 described above. Thus, the assembly 120 comprises a protector block 125 having a plurality of holes in which sets 35 of receptacles 36-40 are mounted. Further, a surge protection module 52, such as is depicted by FIG. 3, may be inserted into any of the receptacle sets 35. When the module 52 is plugged into a receptacle set 35, the module pins 46-50 are inserted into and make electrical contact with the receptacles 36-40, respectively.

Figure 14:
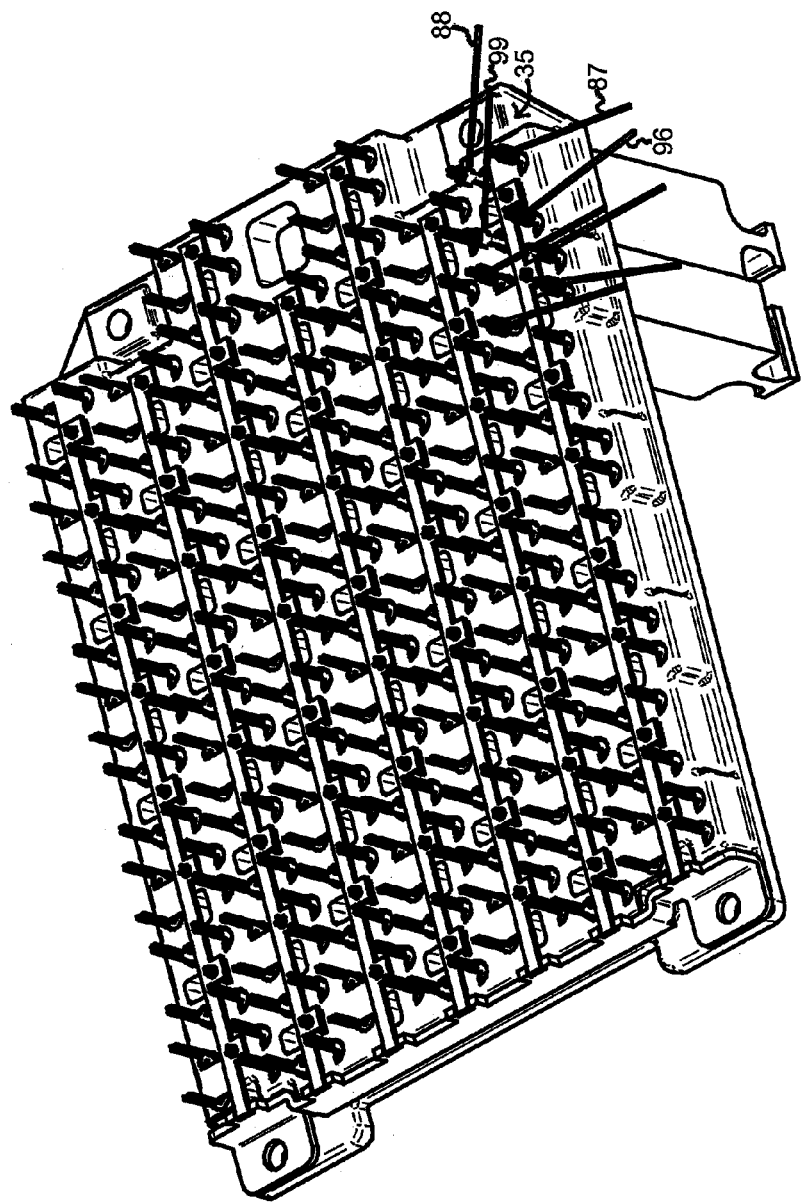
FIG. 14 illustrates a bottom view of a protector block assembly, such as is depicted in FIG. 11.

As shown by FIG. 14, each receptacle set 35 of the assembly 120 may be coupled to a respective subscriber line 17 and communication device 12 in the same way that the receptacle sets 35 of the conventional assembly 20 are coupled to the subscriber lines 17 and communication devices 12. Indeed, for the receptacle set 35 shown by FIG. 14, the end of the tip connection 87 of a subscriber line 17 is wrapped to the receptacle 37, and the end of the ring connection 88 is wrapped to the receptacle 38. Further, connections 96, 99 are respectively wrapped to the receptacles 36, 39. Thus, as in the conventional assembly 20, the communication device 12 may communicate with a remote communication device 15 through a surge protection module 52 and the subscriber line 17, and the surge protection module 52 protects the communication device 12 from high voltages and/or currents that may be present on the subscriber line 17 due to various abnormal conditions or phenomena, such as lightning. Note that the connectivity of tip and ring may be reversed. That is, if desired, the tip connection 87 may be wrapped to the receptacle 38, and the ring connection 88 may be wrapped to the receptacle 37.

Figure 15:
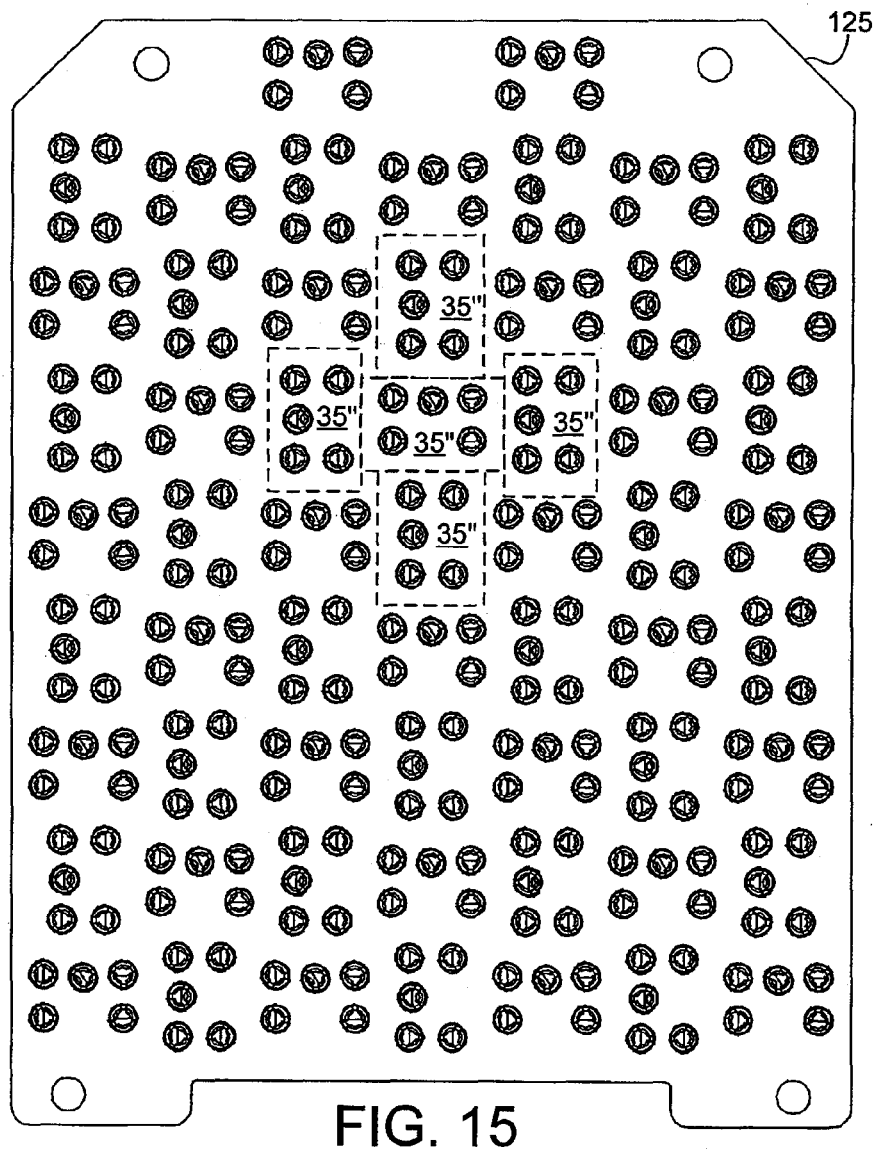
FIG. 15 illustrates a top view of a protector block assembly, such as is depicted in FIG. 11.

FIG. 15 depicts a top view of the protector block 125. As shown by FIG. 15, each set 35 of receptacles is rotated about 90 degrees relative each adjacent set 35 of receptacles. For example, FIG. 15 depicts a set 35' of receptacles surrounded by adjacent receptacle sets 35". For purposes of illustration, each set 35', 35" is marked by dashed reference lines surrounding such set 35', 35". As can be seen by viewing FIG. 15, the pattern for the receptacles 36-40 of set 35' is rotated about 90 degrees relative to each respective pattern for the receptacles 36-40 of sets 35".

Figure 16:
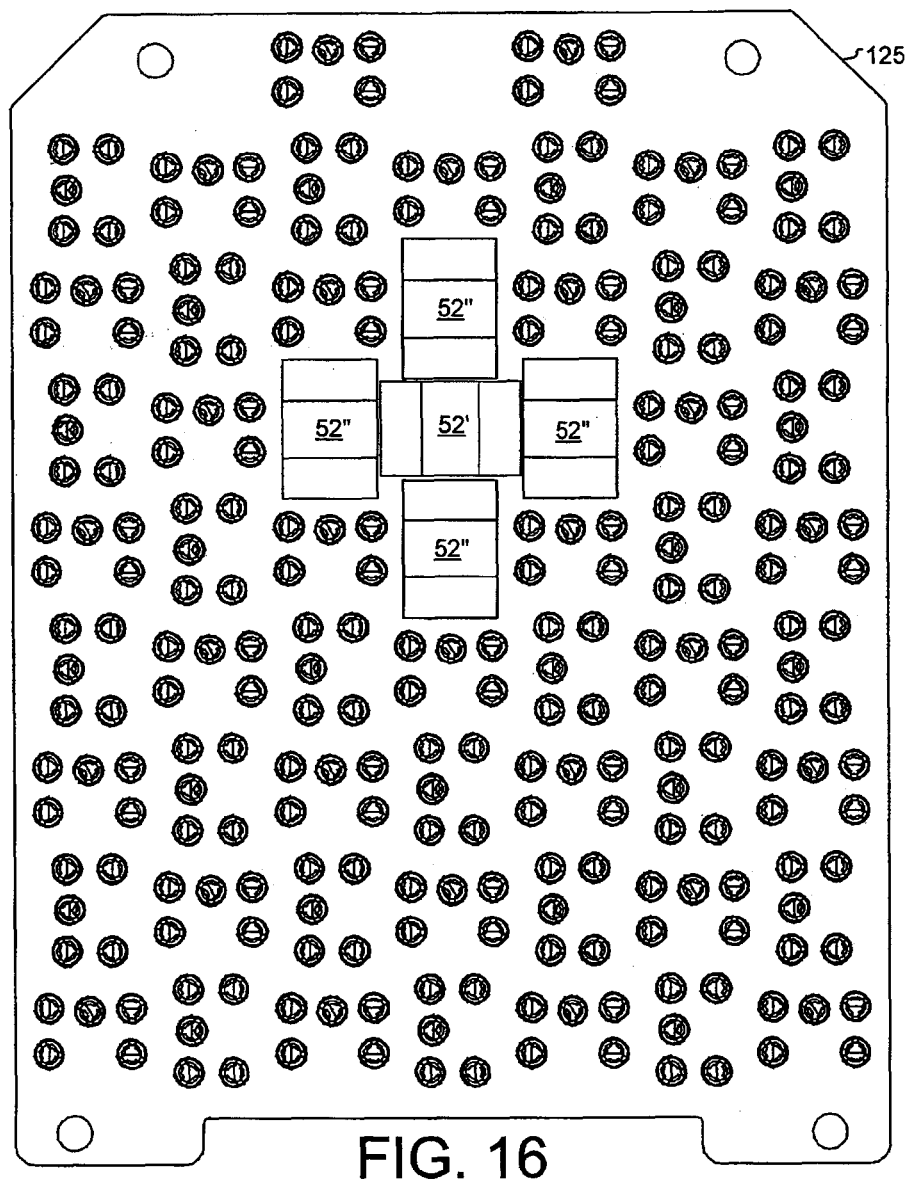
FIG. 16 illustrates a top view of a protector block assembly, such as is depicted in FIG. 15, having a protector block with surge protection modules plugged into the protector block.
Figure 17:
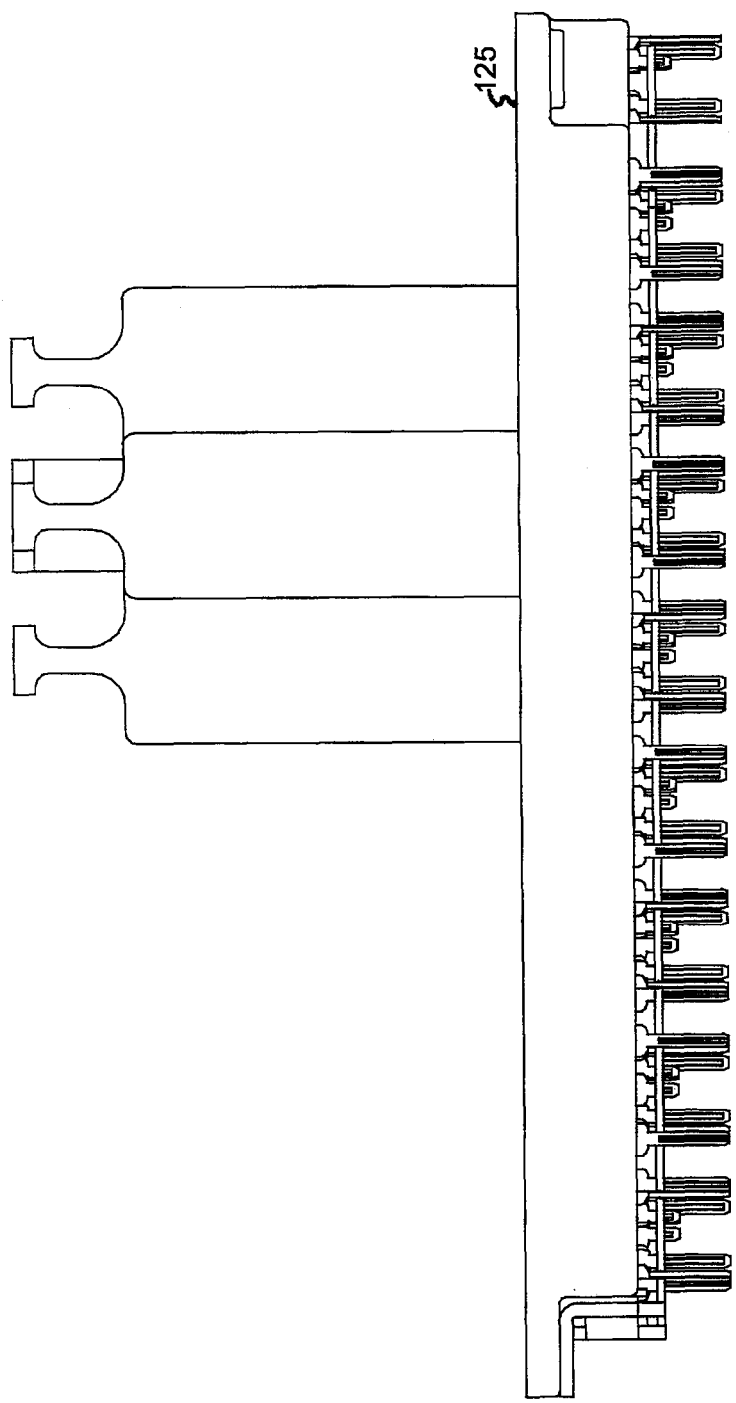
FIG. 17 illustrates a side view of a protector block assembly, such as is depicted in FIG. 16.

Since the receptacle set 35' is rotated about 90 degrees relative to its adjacent sets 35", the orientation of a surge protection module 52' plugged into the set 35' is rotated about 90 degrees relative to the orientations of the adjacent surge protection modules 52" plugged into receptacle sets 35", as shown by FIG. 16. Stated another way for the exemplary module 52 shown by FIGS. 3 and 4, the surge protection module 52' is oriented such that its vertical axis 97 is approximately parallel to the horizontal axes 98 of the adjacent modules 52". Thus, a pin of the tip pair 46, 47 and a pin of the ring pair 48, 49 of the module 52' are about the same distance from the tip pair 46, 47 for some of the adjacent modules 52". For such adjacent modules 52", the amount of energy that couples from the tip pair 46, 47 of the adjacent module 52" into the tip pair 46, 47 of the module 52' is about the same as the amount of energy that couples from the same tip pair 46, 47 of the adjacent module 52" into the ring pair 48, 49 of the module 52'. Therefore, the net effect of the energy from the tip pair 46, 47 of the adjacent module 52" to the differential signal being communicated through the module 52' is about zero. In this regard, when the differential signal is measured by a communication device 12, 15, the crosstalk from the tip pair 46, 47 of the adjacent module 52" and received by the tip pair 46, 47 of the module 52' cancels the crosstalk from the tip pair 46, 47 of the adjacent module 52" and received by the ring pair 48, 49 of the module 52'.

For the foregoing modules 52", a pin of the tip pair 46, 47 and a pin of the ring pair 48, 49 of the module 52' are about the same distance from the ring pair 48, 49 of the module 52". Thus, crosstalk from the ring pair 48, 49 of the adjacent module 52" cancels like the crosstalk from the tip pair 46, 47 of the adjacent module 52" for the reasons described above.

For some other adjacent modules 52", a pin of the tip pair 46, 47 and a pin of the ring pair 48, 49 of the adjacent module 52" are about the same distance from the tip pair 46, 47 of the module 52'. Further, for such adjacent modules 52", a pin of the tip pair 46, 47 and a pin of the ring pair 48, 49 of the adjacent module 52" are about the same distance from the ring pair 48, 49 for the module 52'. Therefore, considering that the voltages of tip and ring are usually opposite, the net effect of the energy from the adjacent module 52" to the voltage of the tip pair 46, 47 of the module 52' is approximately zero, and the net effect of the energy from the adjacent module 52" to the voltage of the ring pair 48, 49 of the module 52' is approximately zero. Accordingly, the amount of crosstalk interference introduced by the adjacent module 52" to the module 52' is dramatically reduced.

Figure 18:
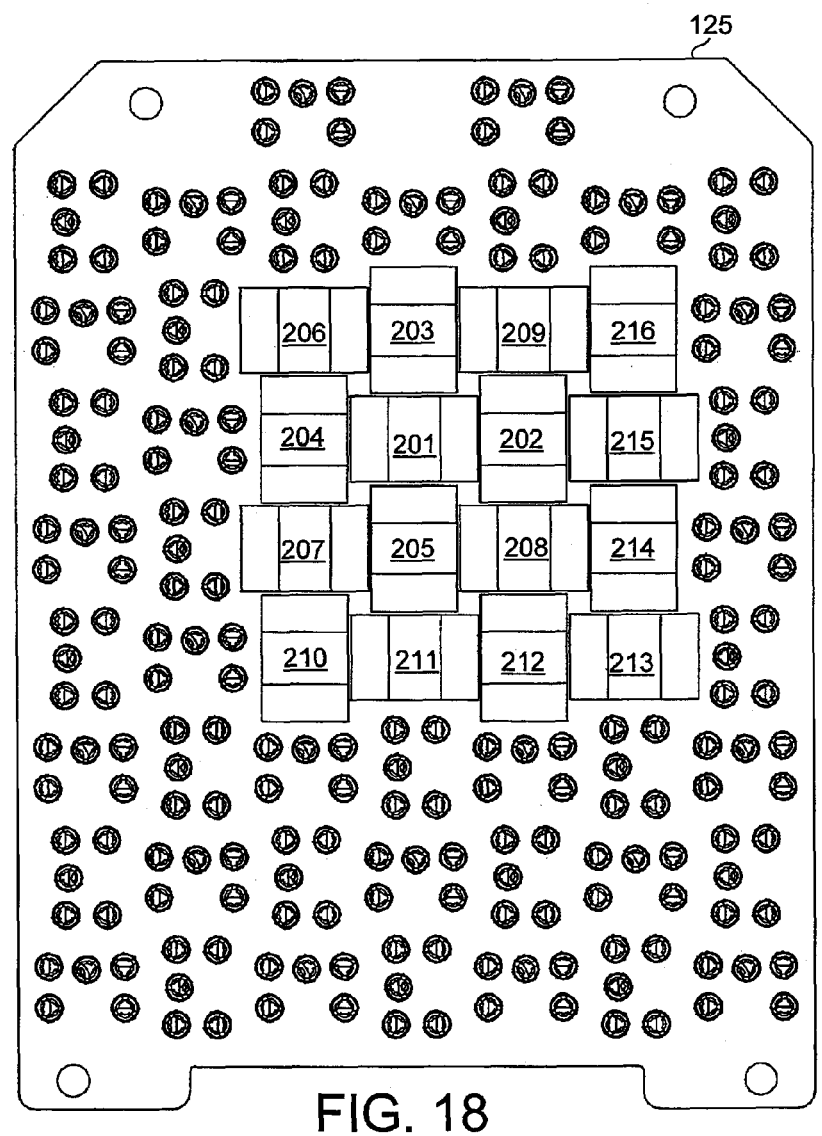
FIG. 18 illustrates a top view of a protector block assembly, such as is depicted in FIG. 15, having a protector block with surge protection modules plugged into the protector block.
Figure 19:
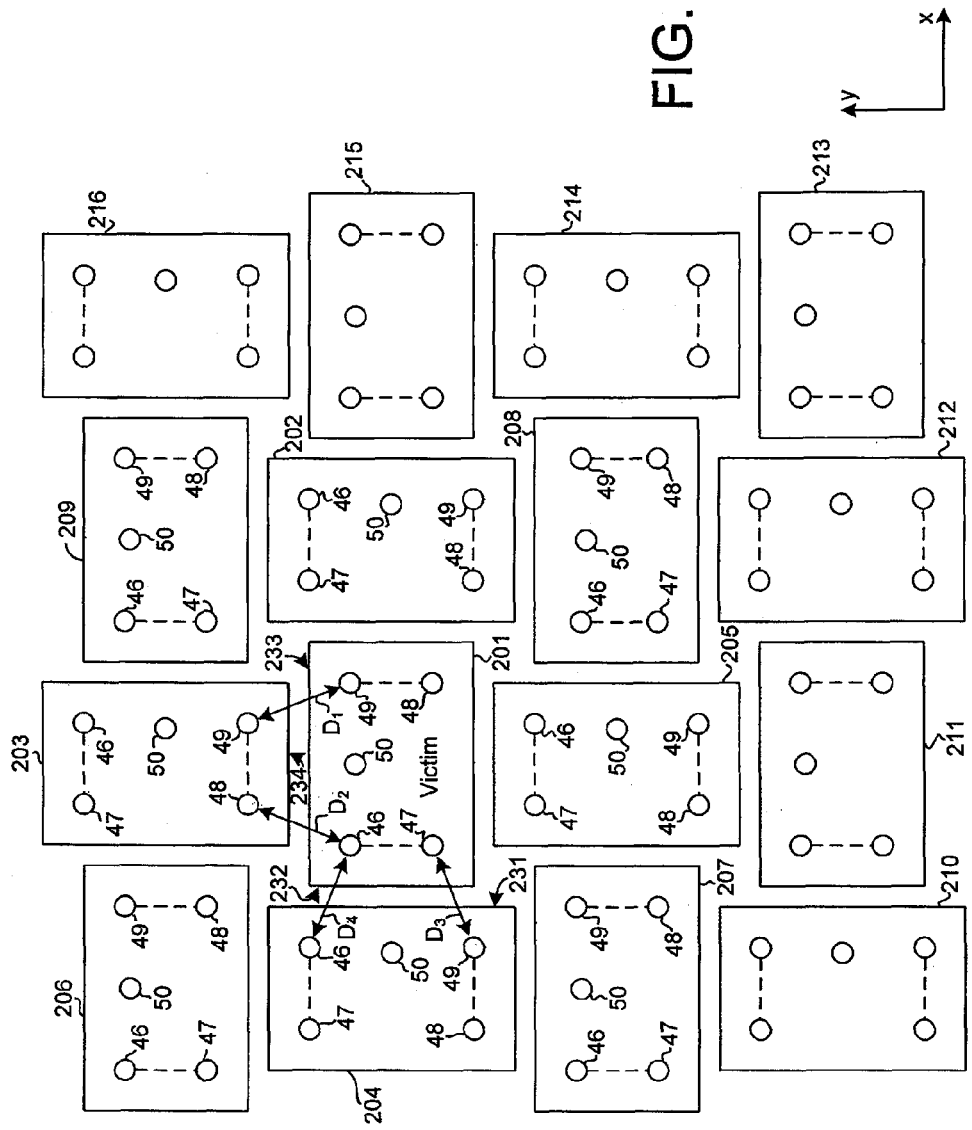
FIG. 19 illustrates a bottom view of the surge protection modules depicted in FIG. 18.

To better illustrate the foregoing, refer to FIGS. 18 and 19. FIG. 18 depicts a top view of a plurality of surge protection modules 201-216 plugged into the protector block 125, and FIG. 19 depicts a bottom view of the modules 201-216 with the protector block 125 removed for ease of illustration. Note that each module 201-216 is configured identically to the conventional module 52 shown by FIG. 3. Further, the following description will describe the crosstalk interference introduced to the module 201, and this module 201 will, therefore, be referred to as the "victim module." However, it is to be understood that energy can couple from any one module 201-216 to any other module 201-216 depending on the strength of the energy and the distance between modules 201-216.

In the example shown by FIG. 19, modules 202-209 are adjacent to the victim module 201. The modules 210-216 are non-adjacent to the victim module 201 in that there is at least one other module between the victim module 201 and each of the modules 210-216.

As shown by FIG. 19, the distance ($D_1$) from the ring pair 48, 49 of module 203 to the ring pair 48, 49 of the victim module 201 is substantially equal to the distance ($D_2$) from the ring pair 48, 49 of module 203 to the tip pair 46, 47 of the victim module 201. As used herein, the distance from a first pair of pins to a second pair of pins refers to the shortest distance between any pin of the first pair and any pin of the second pair. Thus, in FIG. 19, $D_1$ refers to the distance between the pin 49 of the module 203 and the pin 49 of the victim module 201, and $D_2$ refers to the distance between the pin 48 of the module 203 and the pin 46 of the victim module 201. In addition, it is to be noted that when $D_1$ substantially equals $D_2$, the distance from the pin 49 of the victim module 201 to the pin 48 of the module 203 is substantially equal to the distance from the pin 46 of the victim module 201 to the pin 49 of the module 203. In addition, the distances from pin 47 of the victim module 201 to the pins 48, 49 of the module 203 are substantially equal to the distances of the pin 48 of the victim module 201 to the pins 49, 48 of the module 203, respectively. Thus, the ring pair 48, 49 and tip pair 46, 47 of the victim module 201 are symmetric about the ring pair 48, 49 of the module 203. Similarly, the ring pair 48, 49 and tip pair 46, 47 of the victim module 201 are symmetric about the tip pair 46, 47 of the module 203.

Since $D_1$ and $D_2$ are substantially equal in the current example, at any given time, substantially equal amounts of energy couple into the ring pair 48, 49 and the tip pair 46, 47 of the victim module 201 from the ring pair 48, 49 of the module 203. Thus, the amount of crosstalk interference introduced by the ring pair 48, 49 of module 203 to the differential signal being communicated by the victim module 201 is approximately equal to zero. In this regard, when the communication device 12 coupled to the victim module 201 recovers the differential signal, the effects of crosstalk from the ring pair 48, 49 of module 203 substantially cancel.

Similarly, the tip pair 46, 47 of module 203 is located about the same distance from both the tip pair 46, 47 and the ring pair 48, 49 of the victim module 201. Thus, for the same reasons described above with respect to the ring pair 48, 49 of the module 203, the tip pair 46, 47 of the module 203 introduces substantially no crosstalk interference to the differential signal being communicated by the victim module 201. For similar reasons, the module 205 introduces substantially no crosstalk interference to the differential signal being communicated by the victim module 201.

As shown by FIG. 19, the ring pair 48, 49 of the module 204 is located about the same distance from the tip pair 46, 47 of the victim module 201 as the tip pair 46, 47 of the module 204. In other words, $D_3$ and $D_4$ are approximately equal. Thus, the tip pair 46, 47 and the ring pair 48, 49 of the module 204 are symmetric about the tip pair 46, 47 of the victim module 201. Further, the voltage of the tip pair 46, 47 of the module 204 is opposite to that of the voltage of the ring pair 48, 49 of the module 204. Therefore, the net effect of the module 203 to the tip pair 46, 47 of the victim module 201, in terms of crosstalk interference, is approximately zero.

Similarly, the ring pair 48, 49 of the victim module 201 is located about the same distance from both the tip pair 46, 47 and the ring pair 48, 49 of the module 204 such that the tip pair 46, 47 and the ring pair 48, 49 of the module 204 are symmetric about the ring pair 48, 49 of the victim module 201. Thus, for the same reasons described above with respect to the tip pair 46, 47 of the victim module 201, the net effect of the module 204 to the ring pair 48, 49 of the victim module 201 is approximately zero. Since there is no substantial net effect to the voltage of either the tip pair 46, 47 or ring pair 48, 49 of the victim module 201 by the adjacent module 204, the adjacent module 204 introduces substantially no crosstalk interference to the differential signal being communicated by the victim module 201. For similar reasons, the module 202 introduces substantially no crosstalk interference to the differential signal being communicated by the victim module 201.

Note that the modules 201, 204 are oriented such that a side 231 of the module 204 faces a side 232 of the victim module 201. A pin 49 of the ring pair and a pin 46 of the tip pair of the module 204 are both closer to the side 231 than each of the other tip and ring pins 47, 48 of the module 204. Further, the tip pins 46, 47 of the victim module 201 are both closer to the side 232 than each of the ring pins 48, 49 of the victim module 201.

In addition, the modules 201, 203 are oriented such that a side 233 of the victim module 201 faces a side 234 of the module 203. A pin 46 of the tip pair and a pin 49 of the ring pair of the victim module 201 are both closer to the side 233 than each of the other tip and ring pins 47, 48 of the victim module 201. Further, the pins 48, 49 of the ring pair of the module 203 are both closer to the side 234 than each of the tip pins 46, 47 of the module 203.

Furthermore, the diagonally adjacent modules 206-209 are oriented in the same direction as the victim module 201, and the tip pair 46, 47 and the ring pair 48, 49 of each such module 206-209 are located at different distances from the tip pair 46, 47 and the ring pair 48, 49 of the victim module 201. Thus, the modules 206-209 likely introduce at least some crosstalk interference to the victim module 201. However, such modules 206-209 introduce substantially no crosstalk interference to their respective horizontally and vertically adjacent modules. For example, module 209 introduces substantially no crosstalk interference to either module 203 or 202.

Moreover, due to the geometry of the modules depicted by FIG. 19, the modules 206-209 diagonally adjacent to the victim module 201 are located slightly further from the victim module 201 relative to an embodiment in which all of the modules 201-209 are oriented in the same direction, like in the conventional assembly 20. In this regard, the length of the module 202 in the y-direction is greater than its length in the x-direction causing the module 209 to be positioned farther from the victim module 201 in the y-direction for a given separation distance between the modules 202, 209. Since the diagonally adjacent modules 206-209 are located farther from the victim module 201 as compared to diagonally adjacent modules in the conventional assembly 20, the modules 206-209 likely will introduce less crosstalk interference to the victim module 201.

In addition, the non-adjacent modules 210-216 are likely to introduce at least some crosstalk interference to the differential signal communicated by the victim module 201. However, the non-adjacent modules 210-216 are located farther from the victim module 201 relative to the adjacent modules 202-209, and crosstalk interference from these non-adjacent modules 210-216 are, therefore, less of a concern to the performance of the victim module 201 as compared to the adjacent modules 202-209 located closer to the victim module 201.

Moreover, by orienting the receptacles 36-40 and, therefore, the pins 46-49 that plug into the receptacles 36-40 in the manner described above, the amount of crosstalk interference introduced by the protector assembly 120 is significantly reduced relative to the conventional assembly 20. Further, such reduction in crosstalk interference is achieved with only a slight increase in the footprint of the assembly 120 relative to the conventional assembly 20. In addition, the protector block 125 can be configured in the manner described herein without altering the configuration of the surge protection modules 52 so that currently-available modules 52 can be employed.

Figure 20:
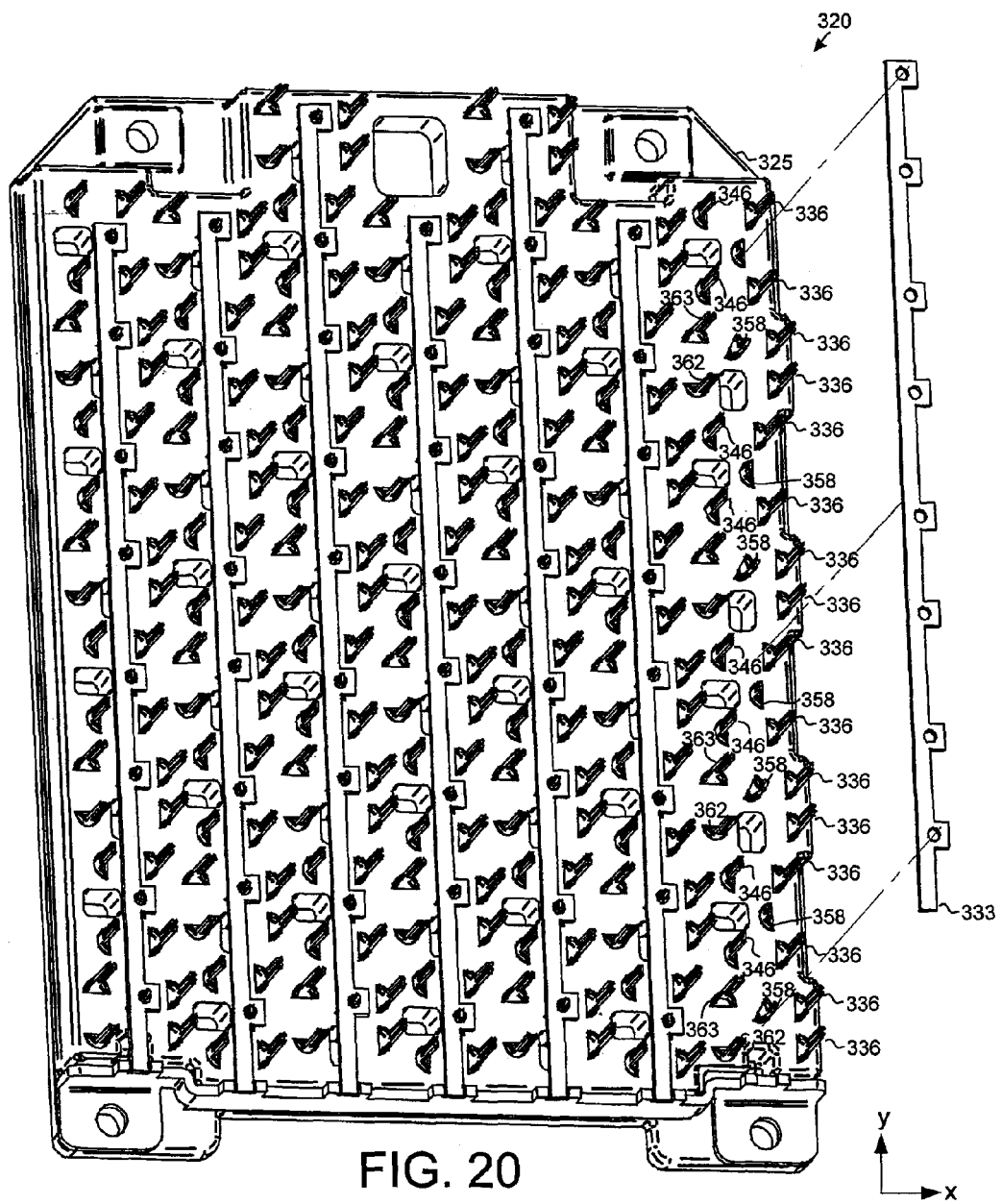
FIG. 20 illustrates a bottom perspective view of a protector block assembly, such as is depicted in FIG. 11.

It should be noted that the orientation of each receptacle 36-40 within its respective hole of the printer block 125 can be selected in an effort to reduce distortion to the signals being communicated via the receptacles 35-40. To better illustrate the foregoing, refer to FIGS. 20 and 21, which depict an exemplary protector block assembly 320 having a protector block 325. The configuration of the protector block 325 is identical to the exemplary protector block 125 described above. FIG. 20 depicts the protector block 325 before a ground strap 333 is positioned on the block 325, and FIG. 21 depicts the protector block 325 after the ground strap 333 has been mounted on the block 325.

Figure 21:
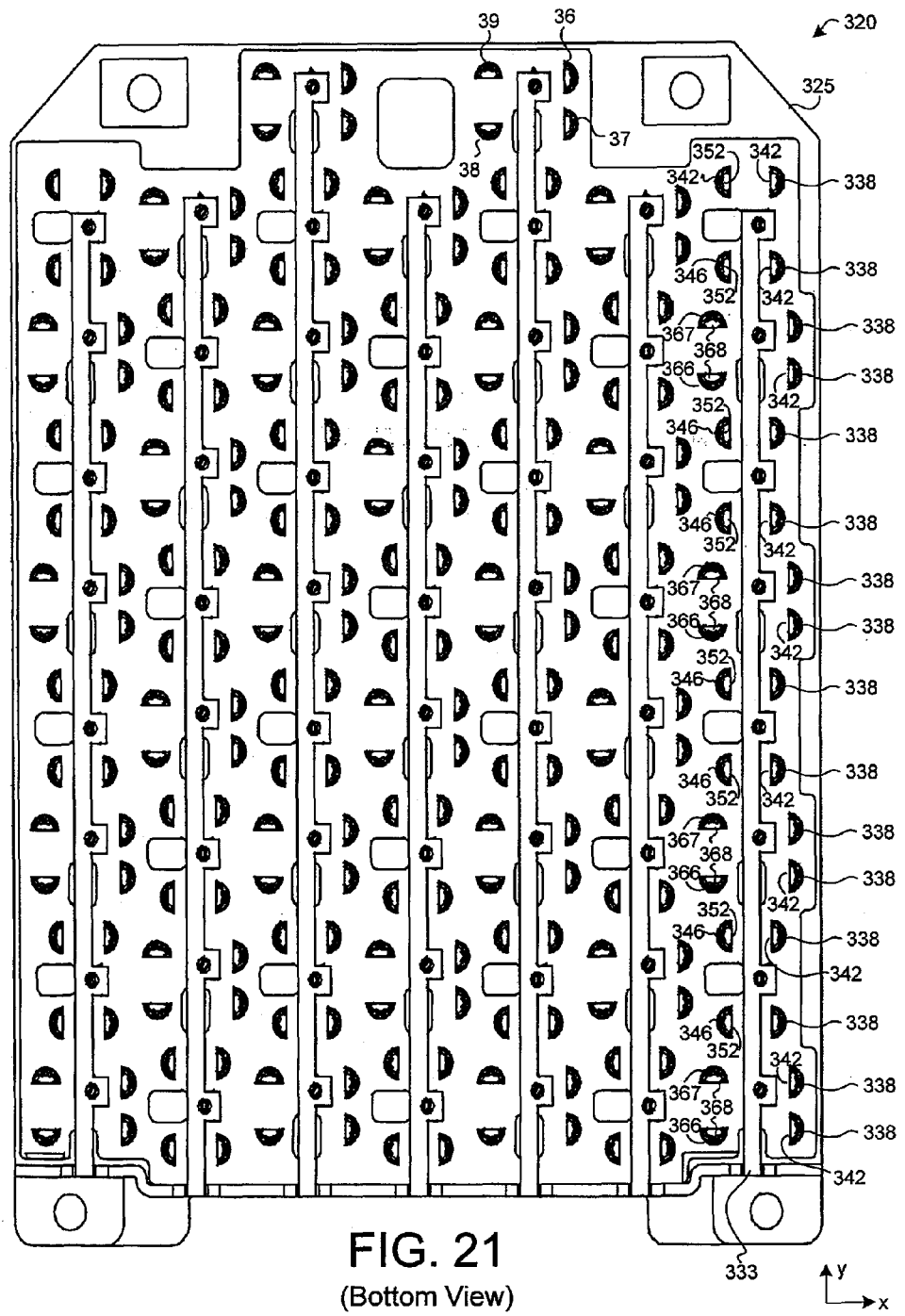
FIG. 21 illustrates a bottom view of a protector block assembly, such as is depicted in FIG. 20.

As shown by FIGS. 20 and 21, a plurality of receptacles 336 (FIG. 20) positioned on one side of the strap 333 are oriented such that the leg 338 (FIG. 21) of each receptacle 336 is located on a side of its respective hole 342 opposite of the strap 333. Thus, each leg 338 is oriented within its respective hole 342 such that it is located as far as possible from the ground strap 333 helping to prevent the voltage of the ground strap 333 from interfering with the voltage of the receptacles 336.

Similarly, a plurality of receptacles 346 (FIG. 20) positioned on the other side of the strap 333 are oriented such that the leg 348 (FIG. 21) of each receptacle 346 is located on a side of its respective hole 352 opposite of the strap 333. Thus, each leg 348 is oriented within its respective hole 352 such that it is located as far as possible from the ground strap 333 helping to prevent the voltage of the ground strap 333 from interfering with the voltage of the receptacles 346. Further, the ground receptacles 358 that connect to the ground strap 333 can be oriented in any desired direction as long as it makes a reliable electrical contact with the strap 333.

A plurality of the receptacles 362, 363 (FIG. 20) are for modules 52 that are oriented horizontally (i.e., have a length in the x-direction that is greater than the length in the y-direction). Such receptacles 362, 363 are further from the ground strap 333 relative to the receptacles 346 (FIG. 20) such that interference from the strap 333 is not as great of a concern. Indeed, it is possible that interference from the adjacent receptacle 362, 363 for the same module 52 is a greater concern than interference from the strap 333. Thus, each receptacle 362 is oriented such that its leg 366 (FIG. 21) is located on a side of its respective hole 368 opposite of the adjacent receptacle 363 that is to be connected to the same module 52. Therefore, each leg 366 is oriented within its respective hole 368 such that it is located as far as possible from the adjacent receptacle 363 to be connected to the same module 52 helping to prevent the voltage of this receptacle 363 from interfering with the voltage of the leg 366.

In addition, each receptacle 363 (FIG. 20) is oriented such that its leg 367 (FIG. 21) is located on a side of its respective hole 368 opposite of the adjacent receptacle 362 that is to be connected to the same module 52. Therefore, each leg 367 is oriented within its respective hole 368 such that it is located as far as possible from the adjacent receptacle 362 to be connected to the same module 52 helping to prevent the voltage of this receptacle 362 from interfering with the voltage of the leg 367.

As shown by FIGS. 20 and 21, the other receptacles adjacent to the other ground straps of the protector block 325 may be similarly oriented in effort to reduce distortion. Further, as shown by FIG. 6, the conventional protector block 25, unlike the protector block 325 depicted by FIG. 20, has receptacles 36-40 that are all oriented in the same direction within their respective holes of the protector block 25.

Moreover, orienting the receptacle sets 35 such that each surge protection module 52 is rotated relative to its horizontally and vertically adjacent modules 52, as described above, helps to reduce crosstalk interference introduced by the protector block assembly 120, 320. In addition, orienting the receptacles 36-40 within their respective holes differently, as described above, helps to further reduce crosstalk interference introduced by the protector block 125, 325. Further, such crosstalk reductions can be achieved with only slight changes to the overall footprint of the protector block 125, 325 and without redesigning the surge protection modules 52 that are plugged into the protector block 125, 325.

Now, therefore, the following is claimed:

1. A protector block assembly, comprising:

a protector block;

a first surge protection module having a first pair of electrically coupled pins inserted into the protector block and a second pair of electrically coupled pins inserted into the protector block, the first surge protection module coupled to a first subscriber line of a telecommunication network; and a second surge protection module adjacent to the first surge protection module and having a third pair of electrically coupled pins inserted into the protector block, the second surge protection module coupled to a second subscriber line of the telecommunication network, wherein the first and second pairs are symmetric about the third pair such that crosstalk energy coupling from one of the modules to the other is canceled.

2. The protector block assembly of claim 1, wherein the first pair includes a first pin and a second pin, wherein the second pair includes a third pin and a fourth pin, wherein the third pair includes a fifth pin and a sixth pin, wherein the second surge protection module has a fourth pair of electrically coupled pins inserted into the protector block, wherein the fourth pair includes a seventh pin and an eighth pin, wherein the first surge protection module is oriented such that the first pin is located a first distance from the fifth pin and the third pin is located a second distance from the sixth pin, and wherein the first and second distances are substantially equal.

3. The protector block assembly of claim 1, wherein the first pair includes a first pin and a second pin, wherein the second pair includes a third pin and a fourth pin, wherein the third pair includes a fifth pin and a sixth pin, wherein the second surge protection module has a fourth pair of electrically coupled pins inserted into the protector block, wherein the fourth pair includes a seventh pin and an eighth pin, wherein the first surge protection module has a first side facing a second side of the second surge protection module, wherein the first and third pins are both closer to the first side than each of the second and fourth pins, and wherein the fifth and sixth pins are both closer to the second side than is each of the seventh and eighth pins.

4. A protector block assembly, comprising:
a protector block having a plurality of holes and a plurality of conductive receptacles positioned within the holes;
a first surge protection module having a plurality of pins inserted into the receptacles of the protector block, the plurality of pins of the first surge protection module including at least a first pin, a second pin, a third pin, and a fourth pin, wherein the first pin is electrically coupled to the second pin by the first surge protection module, wherein the third pin is electrically coupled to the fourth pin by the first surge protection module, and wherein the first and second pins are electrically coupled to a connection of a first subscriber line and the third and fourth pins are electrically coupled to another connection of the first subscriber line; and
a second surge protection module adjacent to the first surge protection module, the second surge protection module having a plurality of pins inserted into the receptacles of the protector block, the plurality of pins of the second surge protection module including at least a fifth pin, a sixth pin, a seventh pin, and an eighth pin, wherein the fifth pin is electrically coupled to the sixth pin by the second surge protection module, wherein the seventh pin is electrically coupled to the eighth pin by the second surge protection module, wherein the fifth and sixth pins are electrically coupled to a connection of a second subscriber line and the seventh and eighth pins are electrically coupled to another connection of the second subscriber line, wherein the first surge protection module is oriented such that the first pin is located a first distance from the fifth pin and the third pin is located a second distance from the sixth pin, and wherein the first and second distances are substantially equal.

5. The protector block assembly of claim 4, wherein the second pin is located a third distance from the fifth pin, wherein the fourth pin is located a fourth distance from the sixth pin, and wherein the third and fourth distances are substantially equal.

6. The protector block assembly of claim 5, wherein the first pin is located a fifth distance from the seventh pin, wherein the third pin is located a sixth distance from the eighth pin, and wherein the fifth and sixth distances are substantially equal.

7. The protector block assembly of claim 4, wherein the first surge protection module has a first side facing a second side of the second surge protection module, wherein the first and third pins are both closer to the first side than is each of the second and fourth pins, and wherein the fifth and sixth pins are both closer to the second side than is each of the seventh and eighth pins.

8. The protector block assembly of claim 4, wherein an axis passing through a center of the sixth pin and a center of the eighth pin is substantially perpendicular to an axis passing through a center of the first pin and a center of the third pin.

9. A protector block assembly, comprising:
a protector block having a plurality of holes and a plurality of conductive receptacles positioned within the holes;
a first surge protection module having a plurality of pins inserted into the receptacles of the protector block, the plurality of pins of the first surge protection module including at least a first pin, a second pin, a third pin, and a fourth pin, wherein the first pin is electrically coupled to the second pin by the first surge protection module, wherein the third pin is electrically coupled to the fourth pin by the first surge protection module, and wherein the first and second pins are electrically coupled to a connection of a first subscriber line and the third and fourth pins are electrically coupled to another connection of the first subscriber line; and
a second surge protection module adjacent to the first surge protection module, the second surge protection module having a plurality of pins inserted into the receptacles of the protector block, the plurality of pins of the second surge protection module including at least a first pair of pins and a second pair of pins, the first pair including a fifth pin and a sixth pin, the second pair including a seventh pin and an eighth pin, wherein the fifth pin is electrically coupled to the sixth pin by the second surge protection module, wherein the seventh pin is electrically coupled to the eighth pin by the second surge protection module, wherein the fifth and sixth pins are electrically coupled to a connection of a second subscriber line and the seventh and eighth pins are electrically coupled to another connection of the second subscriber line, wherein the first surge protection module has a first side facing a second side of the second surge protection module, wherein the first and third pins are both closer to the first side than each of the second and fourth pins, wherein the fifth and sixth pins are both closer to the second side than is each of the seventh and eighth pins, and wherein the first and second pairs are symmetric about the first and second pins.

10. The protector block assembly of claim 9, wherein an axis passing through a center of the sixth pin and a center of the eighth pin is substantially perpendicular to an axis passing through a center of the first pin and a center of the third pin.

11. A method for protecting communication equipment, comprising the steps of:
providing a first surge protection module having a first pair of electrically coupled pins and a second pair of electrically coupled pins;
providing a second surge protection module having a third pair of electrically coupled pins and a fourth pair of electrically coupled pins;
plugging the first surge protection module into a first set of receptacles of a protector block such that the first pair and the second pair are inserted into the first set of receptacles;
electrically coupling the first pair to a first connection of a first subscriber line;
electrically coupling the second pair to a second connection of the first subscriber line; and
plugging the second surge protection module into a second set of receptacles of the protector block such that the third and fourth pairs are inserted into the second set of receptacles and such that the first and second pairs are symmetric about the third pair thereby reducing crosstalk interference induced by one of the modules, the second set of receptacles adjacent to the first set of receptacles;
electrically coupling the third pair to a third connection of a second subscriber line; and
electrically coupling the fourth pair to a fourth connection of the second subscriber line.

12. The method of claim 11, wherein the first pair includes a first pin and a second pin, wherein the second pair includes a third pin and a fourth pin, wherein the third pair includes a fifth pin and a sixth pin, wherein the fourth pair includes a seventh pin and an eighth pin, wherein the first and second surge protection modules, when plugged into the first and second set of receptacles, are oriented such that the first pin is located a first distance from the fifth pin and the third pin is located a second distance from the sixth pin, and wherein the first and second distances are substantially equal.

13. The method of claim 11, wherein the first pair includes a first pin and a second pin, wherein the second pair includes a third pin and a fourth pin, wherein the third pair includes a fifth pin and a sixth pin, wherein the fourth pair includes a seventh pin and an eighth pin, wherein the plugging steps are performed such that the first surge protection module has a first side facing a second side of the second surge protection module, wherein the first and third pins are both closer to the first side than each of the second and fourth pins, and wherein the fifth and sixth pins are both closer to the second side than is each of the seventh and eighth pins.

14. The method of claim 11, wherein the first pair includes a first pin and a second pin, wherein the second pair includes a third pin and a fourth pin, wherein the third pair includes a fifth pin and a sixth pin, wherein the fourth pair includes a seventh pin and an eighth pin, wherein the plugging steps are performed such that an axis passing through a center of the sixth pin and a center of the eighth pin is substantially perpendicular to an axis passing through a center of the first pin and a center of the third pin.

\* \* \* \* \*